United States Patent

Meyer et al.

[15] 3,648,145
[45] Mar. 7, 1972

[54] UNDERVOLTAGE PROTECTION DEVICE

[72] Inventors: Bennett A. Meyer, Port Chester, N.Y.; Kenyon E. B. McGuire, Demarest, N.J.

[73] Assignee: The Singer Company, New York, N.Y.

[22] Filed: May 8, 1970

[21] Appl. No.: 35,701

[52] U.S. Cl. .......................... 320/13, 317/123, 317/148.5
[51] Int. Cl. ................................................. H02j 7/00
[58] Field of Search ............ 307/130, 133, 141.8; 317/123, 317/DIG. 5, 148.5; 320/13, 29, 31, 37, 39, 40

[56] References Cited

UNITED STATES PATENTS

| | | | |
|---|---|---|---|
| 3,308,397 | 3/1967 | Morgan | 321/45 X |
| 3,409,802 | 11/1968 | Savage | 320/40 X |
| 3,243,658 | 3/1966 | Blackburn | 317;317/123;DIG. 5 |
| 3,321,754 | 5/1967 | Grimm et al. | 317;317/123;DIG. 5 |
| 3,447,060 | 5/1969 | Tedd | 320/40 X |
| 3,395,288 | 7/1968 | Von Brimer | 320/40 X |
| 3,474,296 | 10/1969 | Rickey | 320/40 X |
| 3,543,043 | 11/1970 | Dunn | 320/39 X |

Primary Examiner—William M. Shoop, Jr.
Attorney—S. A. Giarratana and Thomas W. Kennedy

[57] ABSTRACT

An undervoltage protection device for a voltage source and a load wherein a first and second switch are connected in a current path established between the voltage source and the load, with each of the switches being adapted to provide an open circuit in the current path. A first circuit is provided for closing the second switch in response to the first switch being closed, the circuit being operable, unless disabled, to open the second switch a predetermined time interval after the first switch closes. An additional circuit disables the first circuit in response to a predetermined minimum output from the voltage source.

1 Claims, 1 Drawing Figure

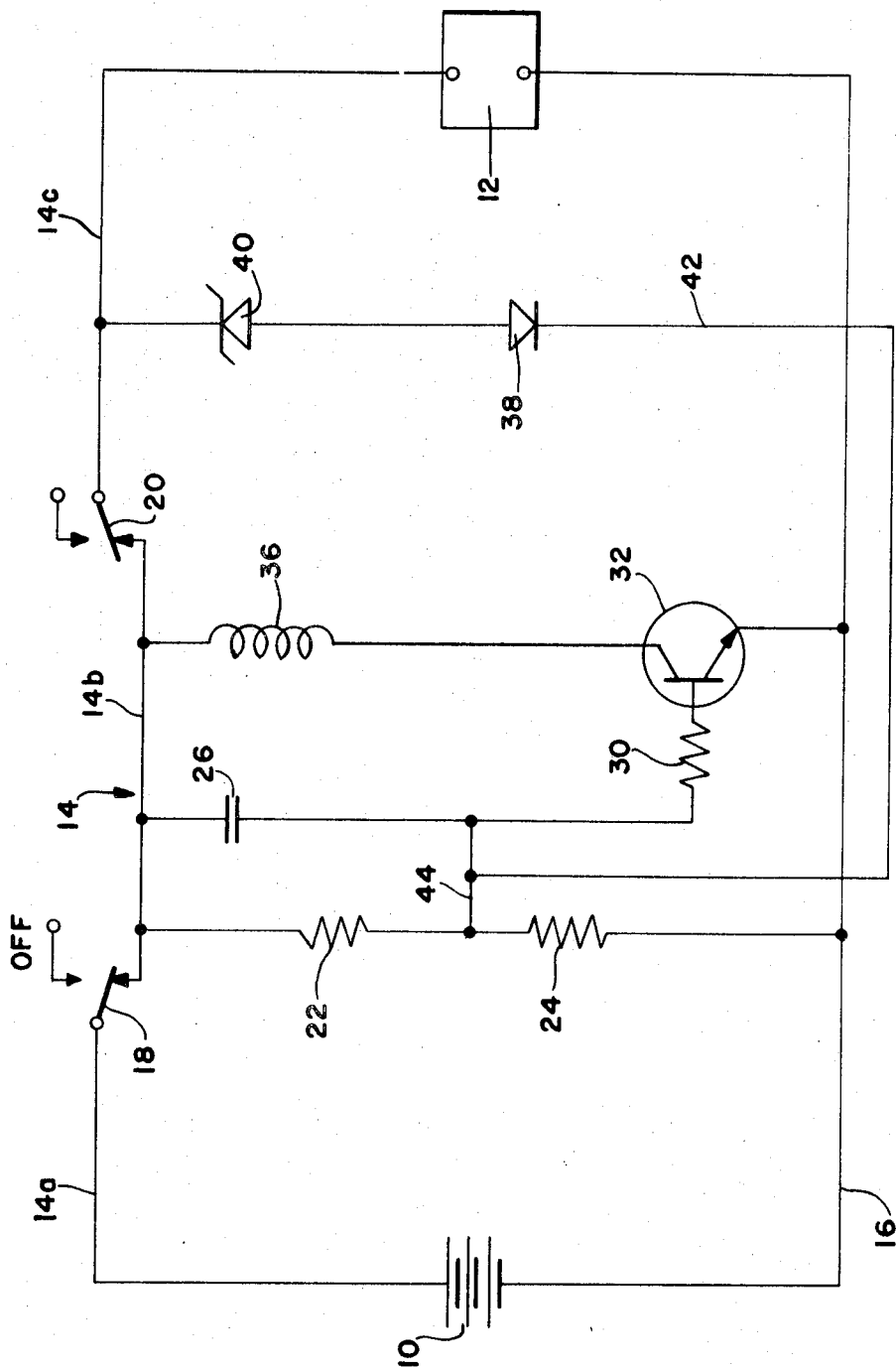

UNDERVOLTAGE PROTECTION DEVICE

BACKGROUND OF THE INVENTION

The invention herein described was made in the course of or under a contract or subcontract thereunder, with the Department of the Air Force.

This invention relates to an undervoltage protection device and, more particularly, to a device for connecting between a voltage source and a load to prevent the voltage source from being used when its terminal voltage falls below a certain value.

When using a voltage source, such as a nickel-cadmium battery, to energize portable equipment it is necessary to monitor the battery voltage and prevent the battery from being used when its terminal voltage falls below a certain value. If the battery is used when its voltage has fallen below the critical value, permanent and irreversible damage will result to the battery due to cell reversal. Moreover, the equipment which is energized by the battery should not function when the terminal voltage of the battery falls below a certain value in order to prevent possible damage to the equipment.

Several proposals have been made for preventing a battery from being used when its terminal voltage falls below a certain value. For example, a voltage-sensing circuit has been devised which is similar in design to a voltage regulator and requires a relatively high number of components. Furthermore, this type of circuit draws current from the battery even after the load circuit has been turned off. Other proposals require a specifically manufactured tapped battery and, in addition, do not provide a firm turnoff point. Thus the circuit can operate in a partially on mode, resulting in equipment malfunctions.

Still other proposals utilize a voltmeter as part of the battery-powered equipment, which requires the operator to continually monitor the battery voltage and stop the operations of the energized equipment when the battery voltage falls below the critical value. In addition to being expensive, the requirement of the constant presence and scrutiny of an operator may be impossible to fulfill under certain operational surroundings.

SUMMARY OF THE INVENTION

It is therefore an object of the present invention to provide a protection device for connection between a voltage source and a load which disconnects the voltage source from the load when the terminal voltage from the voltage source falls below a critical value.

It is a further object of the present invention to provide a protection device of the above type in which a standard battery and a minimum of component parts are utilized.

It is a further object of the present invention to provide a protection device of the above type in which the load is completely disconnected from the battery upon the terminal voltage of the latter falling below a critical value.

It is a still further object of the present invention to provide a protection device of the above type which does not require the constant presence and scrutiny of an operator.

Toward the fulfillment of the above objects, the protection device of the present invention comprises means for establishing a current path between a voltage source and its load, first and second switching means connected in said current path, each adapted to move to an open position to provide an open circuit in said current path, first circuit means responsive to said first switching means being closed for closing said second switching means, said first circuit means being operable, unless disabled, to open said second switching means closed a predetermined time interval after said first switching means closes, and a second circuit means responsive to a predetermined voltage output from said voltage source to disable said first circuit means from opening said second switching means.

BRIEF DESCRIPTION OF THE DRAWING

Reference is now made to the accompanying drawing for a better understanding of the nature and objects of the present invention. The drawing illustrates the best mode presently contemplated for carrying out the objects of the invention and are not to be construed as restrictions or limitations on its scope. The drawing is a circuit diagram of the protection device of the present invention.

DESCRIPTION OF THE PREFERRED EMBODIMENTS

Referring to the drawing, a battery 10 is shown which is connected to a load 12 by means of a pair of conductors 14 and 16. The conductor 14 is made up of three separate conductors, 14a, 14b and 14c, with a switch 18 extending between the conductors 14a and 14b, and a relay switch 20 extending between the conductors 14b and 14c. The switch 18 connects the conductors 14a and 14b in its "on" or closed position, while it provides an open circuit in its "off" or open position. Similarly, the switch 20 connects conductors 14b and 14c in its closed position and provides an open circuit in its open position. The switch 18 is manually operated between its two positions, while the switch 20 is normally open and is operated in a manner to be described later.

A pair of resistors 22 and 24 are connected between the conductors 14b and 16, with the resistor 22 having a very high value, such as 1 megohm, and the resistor 24 having a relatively low value. A capacitor 26 is connected between the conductor 14b and a resistor 30, which, in turn, is connected to the base of a NPN-switching-transistor 32. The resistor 30 is of an intermediate value with respect to the values of the resistors 22 and 24.

The emitter of the transistor 32 is connected to the conductor 16, while the collector is connected to a relay coil 36 which, in turn, is connected to the conductor 14b and is adapted to operate the relay switch 20 in a conventional manner.

A diode 38 and a zener diode 40 are connected in series, via a conductor 42, to a connector 44 extending between the conjunction between the resistors 22 and 24, and the junction between the capacitor 26 and the resistor 30. The zener diode operates to conduct only when a predetermined minimum voltage is present across the conductors 14c and 16.

In operation, and assuming that the switch 18 is in its open position, and the switch 20 is in its normal open position, the switch 18 is manually moved to its closed position as shown, whereby a substantial portion of the current flowing from the battery 10 will pass through the switch into a circuit including the capacitor 26 and the resistor 30, thus applying a potential to the base of the transistor 32 to turn it on. This continues as long as it takes the capacitor 26 to completely charge, and, as a result, current from the conductors 14a and 14b flows thru the relay coil 36 and the conducting transistor 32 to the conductor 16, whereby the coil operates in a conventional manner to move the relay switch 20 from its normally open position to a closed position as shown. This enables the terminal voltage from the battery to be applied to the diodes 38 and 40 and to the load 12.

When the capacitor 26 becomes completely charged, current ceases to flow therethrough, and due to the presence of the very high resistor 22 and the relatively low resistor 24, current flow to the base of the transistor 32 is cut off. Thus the above circuit, including the capacitor 26, normally operates to open the switch 20 a predetermined time interval after the switch 18 closes. However, assuming that the voltage from the battery is above a predetermined critical value, the zener diode 40 will conduct current from the conductor 14, through the conductor 42, and to the conductor 44 whereby current of a sufficient magnitude to maintain the transistor 32 turned on will be applied to its base via the resistor 30, and the coil 36 will remain energized to maintain the switch 20 closed. Thus the latter circuit, including the zener diode 40, operates to disable the circuit, including the capacitor 26, from opening the switch 20.

As long as the voltage from the battery equals or exceeds the critical value for the zener diode, the circuit will operate as described immediately above, and the conductor 42 will apply the current necessary to maintain the transistor 32 turned on, and the switch 20 closed. If, at any time, the voltage of the battery 10 falls below the critical value, the zener diode 40 will not conduct and therefore there will be no current applied to the base of the transistor 32 after the capacitor 26 has become completely charged. As a result, the coil 36 will be deenergized, the switch 20 will be released to move to its normally open position, and the load 12 will be disconnected from the battery 10. The circuit can then be reactuated by operating the switch 18 to its open position to discharge the capacitor through the resistors 22 and 24, and then to its closed position whereby the above sequence will be repeated.

The diode 38 prevents the capacitor 26 from charging through an unwanted circuit path through the zener diode 40 and the load 12. The elimination of this unwanted circuit path increases the stability of the operating time of the relay switch 20 and enables the circuit to perform with a wide range of load currents.

Of course, if at any time it is desired to disconnect the load from the battery, the switch 18 is simply moved to its open position, which causes the capacitor 26 to discharge as described above, whereby the circuit will be ready for immediate actuation.

The device of the present invention has several advantages. It draws no current from the battery when the battery is disconnected from the load except through the very large resistor 22, and consumes a small amount of current while it operates to connect the battery to the load. Also, it will not "chatter" when the battery voltage is at the critical threshold, and will not automatically connect the battery to the load as a result of the battery voltage spontaneously rising because of a no load condition, after the device has operated to disconnect the battery from the load.

Further, the device of the present invention can be recycled by operating the power switch, and its operation is automatic with no operator's attention required. Still further, no battery taps are required and a small number of components are utilized.

Also, the voltage threshold stability of the device of the present invention is limited solely by the zener diode, and it removes the load with a positive switching action immediately after the battery voltage falls below the critical value.

It is understood that several variations in the above may be made without departing from the scope of the invention. For example, in order to increase the stability of operation over a range of temperatures, a number of zener diodes similar to zener diode 40 can be operated in series. These individual diodes should be selected so that the resultant zener voltage is the value desired and the thermal coefficient is 0. Other variations of the specific construction and arrangement of the device disclosed above can be made by those skilled in the art without departing from the invention as defined in the appended claims.

We claim:

1. A protection device for a voltage source and a load, comprising means for establishing a current path between said voltage source and said load, first and second switching means connected in said current path, each adapted to move to an open position to provide an open circuit in said current path, first circuit means responsive to said first switching means being closed for closing said second switching means, said first circuit means being operable, unless disabled, to open said second switching means a predetermined time interval after said first switching means closes, and second circuit means responsive to a predetermined voltage output from said voltage source to disable said first circuit means from opening said second switching means, wherein said second switching means is in the form of a relay switch, wherein said first circuit means comprises a coil adapted to energize said relay switch to close same and a switching transistor responsive to said first switching means being moved to a closed position for connecting said coil in said current path, wherein said switching transistor is connected in said current path by means of a capacitor in a manner so that said transistor is turned on only during the charging of said capacitor in response to said first switching means being closed, wherein said second circuit means comprises a zener diode connected in said current path between said second switching means and the base of said switching transistor, and wherein said second circuit means further comprises a diode connected in series with said zener diode, said diode connected so as to prevent said capacitor from charging through said load.

* * * * *